E. E. NORQUIST.
GUARD AND CLEANING ATTACHMENT FOR STOCK WATERING TROUGHS.
APPLICATION FILED JAN. 24, 1908.
899,129.
Patented Sept. 22, 1908.
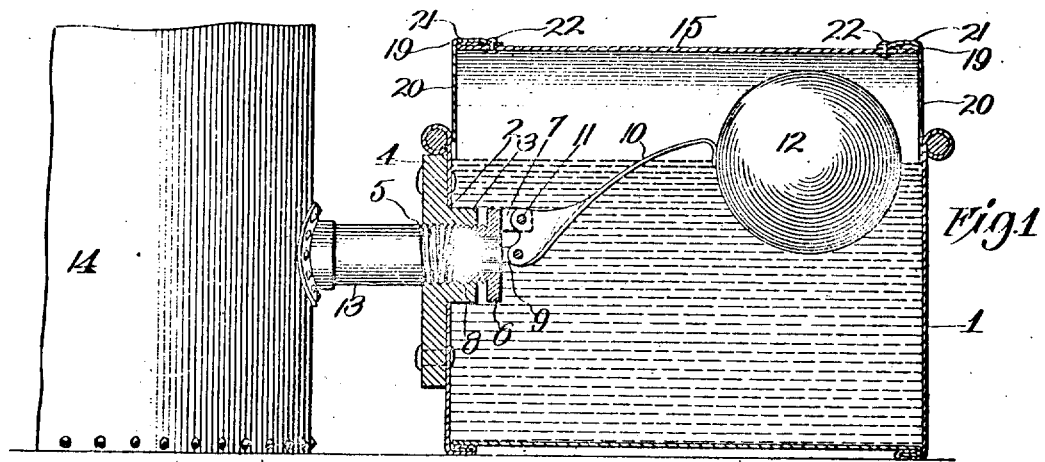
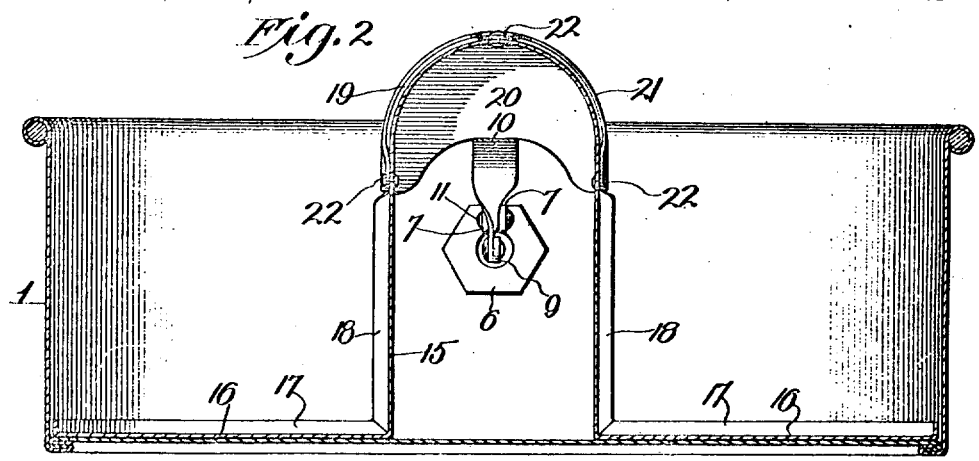
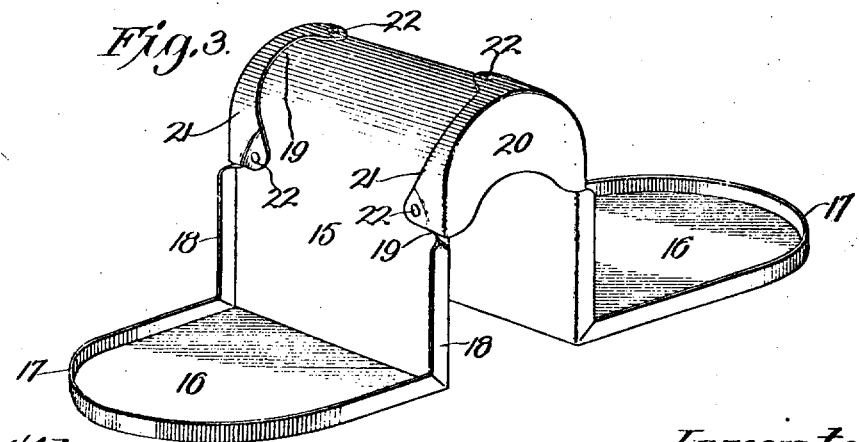
Witnesses
Frank R. Glore
H. C. Rodgers
Inventor
E. E. Norquist
By George F. Thorp Atty.

UNITED STATES PATENT OFFICE.

EMANUEL E. NORQUIST, OF KANSAS CITY, MISSOURI.

GUARD AND CLEANING ATTACHMENT FOR STOCK-WATERING TROUGHS.

No. 899,129.      Specification of Letters Patent.      Patented Sept. 22, 1908.

Application filed January 24, 1908. Serial No. 412,380.

*To all whom it may concern:*

Be it known that I, EMANUEL E. NORQUIST, a citizen of the United States, residing at Kansas City, in the county of Jackson and State of Missouri, have invented certain new and useful Improvements in Guard and Cleaning Attachments for Stock-Watering Troughs, of which the following is a specification.

This invention relates to guard and cleaning attachments for stock watering troughs, and my object is to produce an efficient attachment of the character named which can be instantly placed in or removed from a trough but which cannot be dislodged from or disarranged in the trough by hogs or other stock.

A further object is to produce an attachment which efficiently guards the float from injury by the stock and by which trash and muddy water can be withdrawn from the trough without moving the same.

A still further object is to produce a device, which in more or less modification of form and size, can be applied to any of the approved types of automatically filling watering troughs now in use.

With these objects in view the invention consists in certain novel and peculiar features of construction and organization as hereinafter described and claimed; and in order that it may be fully understood reference is to be had to the accompanying drawing, in which, Figure 1, is a central vertical transverse section of a watering trough equipped with an attachment embodying my invention and shown in operative relation to a supply tank. Fig. 2, is a central vertical longitudinal section of a trough and attachment. Fig. 3 is a detail perspective view of the attachment.

In the said drawings 1 indicates a watering trough of the usual or any preferred type, the trough shown being of elongated form with semi-circular or rounded ends.

2 is an opening in the side of the trough and projecting into the latter through said opening is the nipple 3 of a plate 4 riveted or otherwise secured to the trough and provided with a threaded passage 5. 6 indicates a nut engaging said threaded passage and provided with a pair of inwardly projecting lugs 7.

8 is a valve adapted to seat against the outer end of the nut 6 and carried by a bolt 9 pivoted at its inner end to a ductile lever 10 fulcrumed at 11 to and between lugs 7 and equipped at its free end with a float 12.

13 is a pipe connecting plate 4 with a supply-tank 14 of any suitable character, said tank being adapted to stand charged with water which is adapted to flow into the trough and keep the latter charged to a predetermined depth, this depth being regulated by bending the ductile lever 10 so as to vary the position of the float vertically.

For the purpose of protecting the float from injury by the stock and to effect the removal of dirt, trash and muddy water from the trough whenever desired, I provide an attachment preferably of sheet metal and consisting of an arched portion 15 of greater depth by preference than the trough and adapted to fit therein over the float and valve connections. From the lower ends of the arch a pair of arms 16 project. These arms fitting with a comparative degree of snugness against the sides and ends of the trough though not so tightly as to prevent the water which enters the trough beneath the arch from occupying the portions of the trough at opposite sides of the arch, that is the portions forming the drinking chambers or compartments.

To stiffen the arms and also to insure the retention thereon of dirt or trash, they are provided with shallow or low marginal walls 17, and to stiffen the arch similar walls or flanges 18 are provided, the upper portions of flanges 18 being bent or hammered down upon the rounded portion of the arch as at 19 in order to permit the caps 20 to be fitted snugly on the arch, said caps having inwardly projecting flanges 21 fitting over the flattened flanges 19 and being secured to the arch by rivets 22. These caps 20 close the ends of the arch to a plane below the upper edge of the trough and thus guard against a hog getting his nose under the arch and possibly dislodging the attachment or disarranging the float.

The attachment maintains its position in the trough by gravity and cannot be removed except by grasping its arch and pulling directly upward, the result of this action, if performed quickly, being to lift practically all of the water out of the drinking chambers together with any mud or trash which has settled upon the arms. The attachment can then be slipped back into position, it being noticed that no bolts or fastening devices of any kind are employed to secure the attachment in position.

Having thus described the invention what I claim as new and desire to secure by Letters Patent, is:—

1. The combination with a watering trough of a supply tank connected to said watering trough through one of the walls thereof, a valve controlling such connection, a float connected to the valve and located in the trough and adapted when the latter is charged with the required volume of water to cause said valve to close and when the water level in the trough falls, to descend and open said valve, and an attachment fitting in said trough and comprising an arched central portion overlying and protecting or guarding the float, and arms projecting outwardly from the lower ends of said arch and substantially covering the bottom of the trough at opposite sides of the arch.

2. A watering trough attachment, comprising an arch having outwardly projecting arms at its lower ends equipped with marginal walls.

3. The combination with a watering trough of a supply tank connected to said watering trough through one of the walls thereof, a valve controlling such connection, a float connected to the valve and located in the trough and adapted when the latter is charged with the required volume of water to cause said valve to close and when the water level in the trough falls, to descend and open said valve, and an attachment fitting in said trough and comprising an arched central portion overlying and protecting or guarding the float, and arms projecting outwardly from the lower ends of said arch and substantially covering the bottom of the trough at opposite sides of the arch, and flanges or walls projecting upwardly from the margins of said outwardly projecting arms.

In testimony whereof I affix my signature, in the presence of two witnesses.

EMANUEL E. NORQUIST.

Witnesses:
 H. C. RODGERS,
 G. Y. THORPE.